US006053301A

United States Patent [19]
Kamei

[11] Patent Number: 6,053,301

[45] Date of Patent: Apr. 25, 2000

[54] APPARATUS FOR FEEDING CONNECTORS TO A HARNESS-MAKING SYSTEM

[75] Inventor: Kazuaki Kamei, Yamato, Japan

[73] Assignee: Molex Incorporated, Lisle, Ill.

[21] Appl. No.: 09/079,068

[22] Filed: May 14, 1998

[30] Foreign Application Priority Data

May 23, 1997 [JP] Japan .................................... 9-150039

[51] Int. Cl.[7] ...................................................... B65G 25/10

[52] U.S. Cl. ..................................... 198/418.1; 198/418.5; 198/432; 198/433

[58] Field of Search .............................. 198/418.1, 418.5, 198/432, 433, 363

[56] References Cited

U.S. PATENT DOCUMENTS 4,821,864 4/1989 Lock et al. ........................... 198/418.1
5,560,471 10/1996 Prochut et al. ......................... 198/433
5,653,328 8/1997 Pedrotto .................................. 198/433
5,967,293 10/1999 Gaines .................................... 198/433

*Primary Examiner*—Christopher P. Ellis
*Assistant Examiner*—Mark A. Deuble
*Attorney, Agent, or Firm*—Charles S. Cohen

[57] ABSTRACT

An improved connector feeding apparatus for use with a wire harness-making system is described and includes a series of slots for holding longitudinal trains of connectors, a finger plate positioned above individual connector slots that is driven by a linear drive mechanism in a manner that permits the finger plate to move longitudinally along the trains of connectors. The finger plate includes an associated lift mechanism that can be raised and lower onto a preselected train of connectors and which engages a selected connector at the lowest extent of the lift mechanism. A shuttle is positioned ahead of the connector slots and receives connectors moved therefrom. The shuttle is driven linearly in a direction transverse to the longitudinal movement of the connectors within the connector slots. A connector loading means that ejects the connectors from the shuttle is positioned so it may face the shuttle when being driven alongside of the connector slots.

17 Claims, 6 Drawing Sheets

APPARATUS FOR FEEDING CONNECTORS TO A HARNESS-MAKING SYSTEM

BACKGROUND OF THE INVENTION

The present invention relates generally to connector feeding apparatus, and more particularly to connector feeding apparatus used in wire harness-making systems in which one or more electrical connectors are attached to opposite ends of a set of wires.

Conventional connector feeding apparatus for harness-making systems are constructed to select the number and type of connectors in a predetermined order and subsequently feed them to a connector attachment station where they are connected to a set of electrical wires in order to provide wire harnesses. These conventional connector-feeders are operatively connected to the connector holder of the harness-making apparatus. This connector-feeder includes a connector table lift positioned ahead of the connector holder, which holds a series of connectors in parallel arrangements. A shuttle is positioned ahead of this table lift, and the shuttle reciprocates vertically between the table lift and a connector loading station.

In operation, a preselected number of connectors are shifted from the connector holders to the table lift, and then transferred from the table lift to the shuttle in a particular, predetermined order. This connector shuttle carries the connectors to the connector loading station. The connector holder has a series of elongated, adjustable stops, one such stop being allocated to a single connector slot in which a plurality of connectors are arranged in serial order. Thus, the number of connectors that are to be fed from each connector slot to the table lift is set in terms of adjusting the length of the elongated stop.

The table lift is used to carry connectors from the upper level of the connector holder and its associated connector slots to a lower level where in the shuttle is located. This entire structure is so designed that the connectors are not easily shifted from the connector holder level to the connector shuttle at one and the same level. At the connector loading station, a piston-and-cylinder drive is positioned that is responsive to the arrival of the shuttle. This drive includes a reciprocating rod that, when actuated, pushes the connectors out of the shuttle and putting them in the wire attachment station where harnesses are formed as the connectors are applied to opposite ends of the harness wires.

FIG. 6 illustrates such a conventional connector-feeder 60 that includes a connector table lift 61 that reciprocates vertically as indicated by arrow 62 and a reciprocating shuttle 63 that moves horizontally as indicated by arrow 64. The connector holder 80 has elongated stops 65 associated therewith that may be adjusted in their length by way of an associated set screw 66. A first piston cylinder drive 68 has a rod 67 that is reciprocatably driven along the path indicated by 69, while a second piston cylinder drive 70 is positioned at the connector loading station, and includes a pushrod 71 that is reciprocatably driven as indicated by arrow 72.

In operation, connectors are fed from four part feeders (not shown) to the connector slots 73 of the connector holders 80 indicated by arrow 74. The connector table lift 61 is raised to the upper level of the connector slots 73 and a needed number of connectors 4 are shifted from each connector slot to each corresponding slot 61*a* in the raised table lift 61. The table lift 61 is then lowered to the lower level, where the connectors 4 taken from a selected connector slot 73 are pushed into the slot 63a of the shuttle 63. The needed combination and permutation of different connectors are thereby arranged in the shuttle slot 63a and are brought to the connector loading station where the connectors are subsequently pushed to the wire connecting station by way of the second piston-and-cylinder drive 70.

Every time the combination and permutation of connectors has to be changed to meet particular requirements for the wire harnesses being formed, the extended length of the extendable rod stop 65 for each connector slot 73 must also be adjusted. This adjustment and other preliminary arrangements are time-consuming and require some skillfulness, thereby lowering the working efficiency of the harness-making system. For example, when the combination and permutation of connectors are changed from a 3-pole connector, 3-pole connector, 5-pole connector, 2-pole connector, 2-pole connector pattern to a 3-pole connector, 4-pole connector, 2-pole connector arrangement, the extendable rod stops 65 of all connector slots 73 must have their extended length readjusted to permit the new required numbers of different connectors to be fed from selected connector slots.

In instances where the similar type of connectors appear repeatedly in a required combination and permutation or in instances where a different number of similar connectors appear in a required combination and permutation, the connector feeder of FIG. 6 cannot meet these complicated requirements with ease because the connectors 4 must be shifted to the shuttle by way of the table lift 61. Thus, there is a limit to the making of harnesses, as for example: assume that 2-pole connectors, 3-pole connectors, 4-pole connectors and 5-pole connectors are respectively fed from the four connector slots. The combination-and-permutation of a 2-pole connector, 3-pole connector, 2-pole connector, 4-pole connector, 3-pole connector arrangement cannot be formed in the feeding process. The vertical movement of the table lift up and down disadvantageously takes a significant length of time which increases with the increase of the number of connectors to be combined. This consequently extends the length of time for the feeding apparatus to complete a cycle of loading. Also disadvantageously, the stroke of the pushing rod 71 at the connector loading station must also then be adjusted variably with the varying combination of connectors on the shuttle 63.

A need therefore exists for a less complicated and more efficient connector feed apparatus for use in the assembly of wire harnesses.

SUMMARY OF THE INVENTION

In view of the above one object of the present invention is to provide a connector feeder which permits an easy preliminary arrangement to meet a required combination and permutation of connectors no matter what demands may be made in the making of different harnesses.

To attain this object, the present invention provides a connector feeding apparatus that it includes: (a) means for holding longitudinal trains of connectors fed from associated part feeders, in the form of elongated connector slots; a finger plate positioned above the connector slots and having a linear drive mechanism associated therewith for driving the finger plate longitudinally along the axes of the trains of connectors held by their respective slots; the finger plate having a plurality of connector-engagement fingers, each of which has a lift mechanism associated therewith to raise and lower the finger into engagement with a selected connector train at the lower position of the lift mechanism; a shuttle positioned ahead of and in the same plane as the connector slots, the shuttle receiving connectors moved out of the connector slots by an associated finger of the finger plate, the shuttle being reciprocatably driven by an associated drive means in a direction transverse to the axes of the connector trains; and, connector loading means for ejecting the connectors received in the shuttle, the loading means being positioned alongside the connector slots so that it faces the connector shuttle when it is driven from its position in opposition to the connector slots.

The connector slots are arranged in parallel rows and the finger plate includes a corresponding series of individual fingers disposed so that each finger is aligned with a single connector slot. Each connector slots may further include a spring-biased stop that is normally interposed in the path of its associated train of connectors. Each connector slots may also include a brake mechanism to prevent the train of connectors from advancing.

The apparatus includes, in its preferred embodiment, upper and lower endless belts that extend lengthwise of the connector trains that may be moved into contact therewith for driving the connector trains forward in their connector slots. The connector loading means may includes a pushrod that is driven in and out of an associated cylinder, the pushrod being arranged alongside the connector slots so that it faces the connector shuttle when the connector shuttle is moved from the connector slots to a connector loading position.

The connector feeder apparatus of the present invention allows a preselected number of connectors to be moved out of a selected train of connectors to the coplanar shuttle by way of the particular fingers that extend down from the finger plate, when the finger plate's drive mechanism is actuated. The number of connectors shifted from each connector slot to the connector shuttle may be easily determined in terms of the stroke of the finger plate.

The connector shuttle is advantageously positioned so it is coplanar with the connector slots to thereby eliminate any lifting movement that would be required for carrying connectors from the connector trains to lower level as is done in the prior art. Therefore any required number of connectors, either of same or different types may be effectively selected and combined in any desired permutation before shifting of the connectors from the slots to the connector shuttle, which involves only a minimum of time.

These and other objects, features and advantages of the present invention will be clearly understood through consideration of the following detailed description.

BRIEF DESCRIPTION OF THE DRAWINGS

In the course of the following description of the detailed description, reference will be made to the attached drawings wherein like reference numerals identify like parts and wherein.

DETAILED DESCRIPTION OF THE INVENTION

Figure 1:
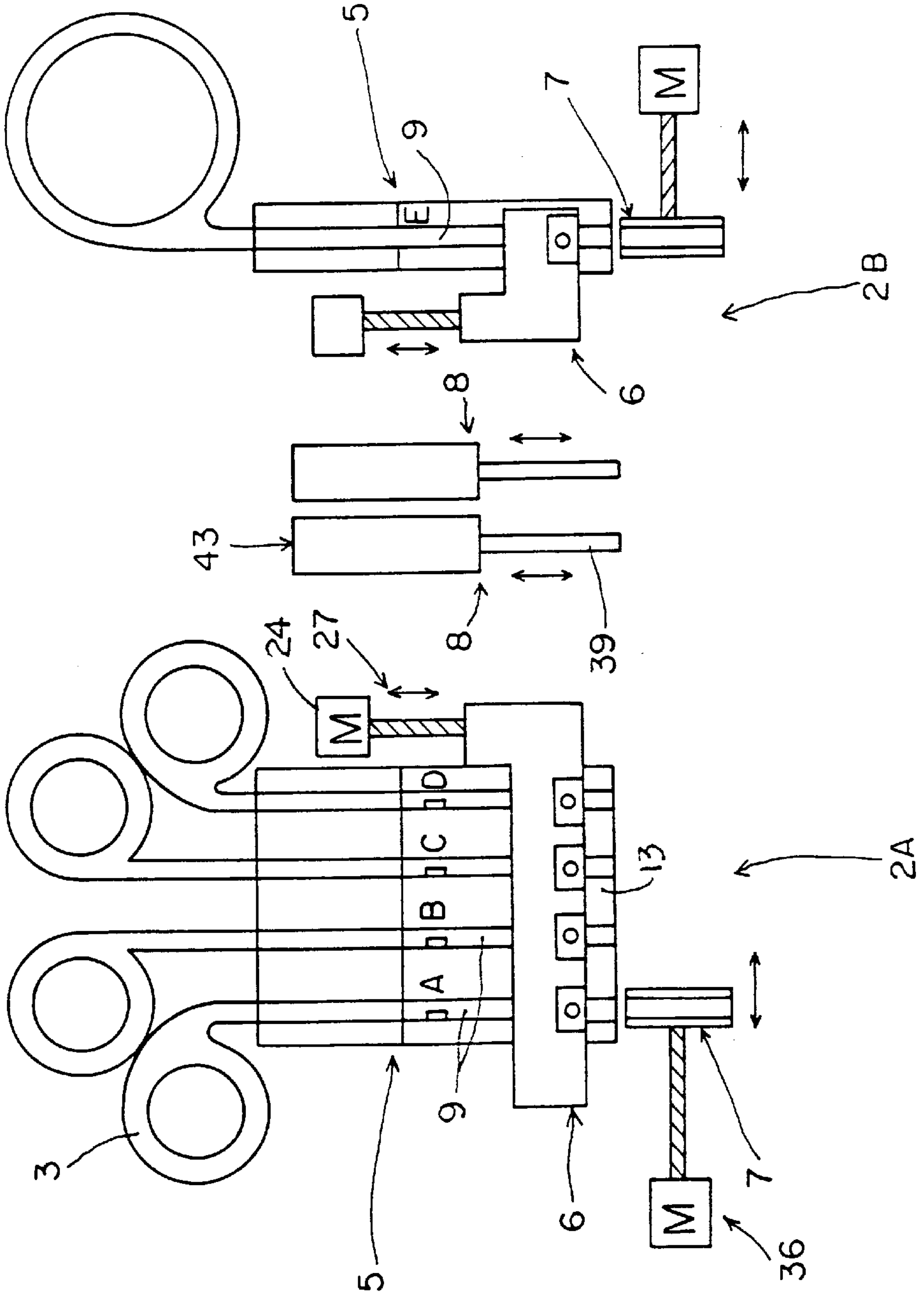
FIG. 1 is a plan view of a connector feeder apparatus constructed in accordance with the principles of the present invention.
Figure 5:
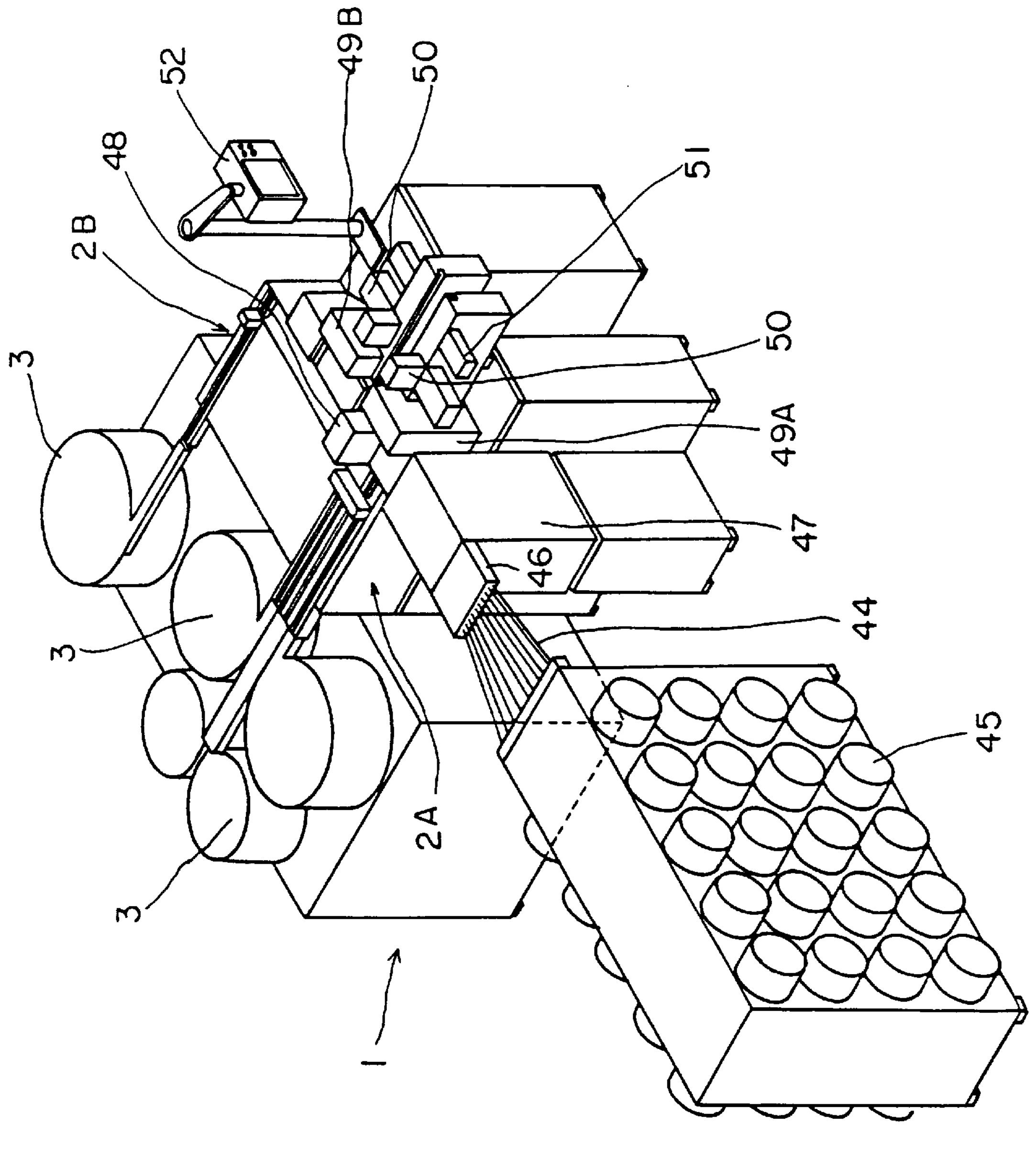
FIG. 5 is a perspective view of a harness making apparatus having a connector feeder apparatus of the present invention associated therewith; and, FIG. 6 is a perspective view of a known connector feeder apparatus.
Figure 6:
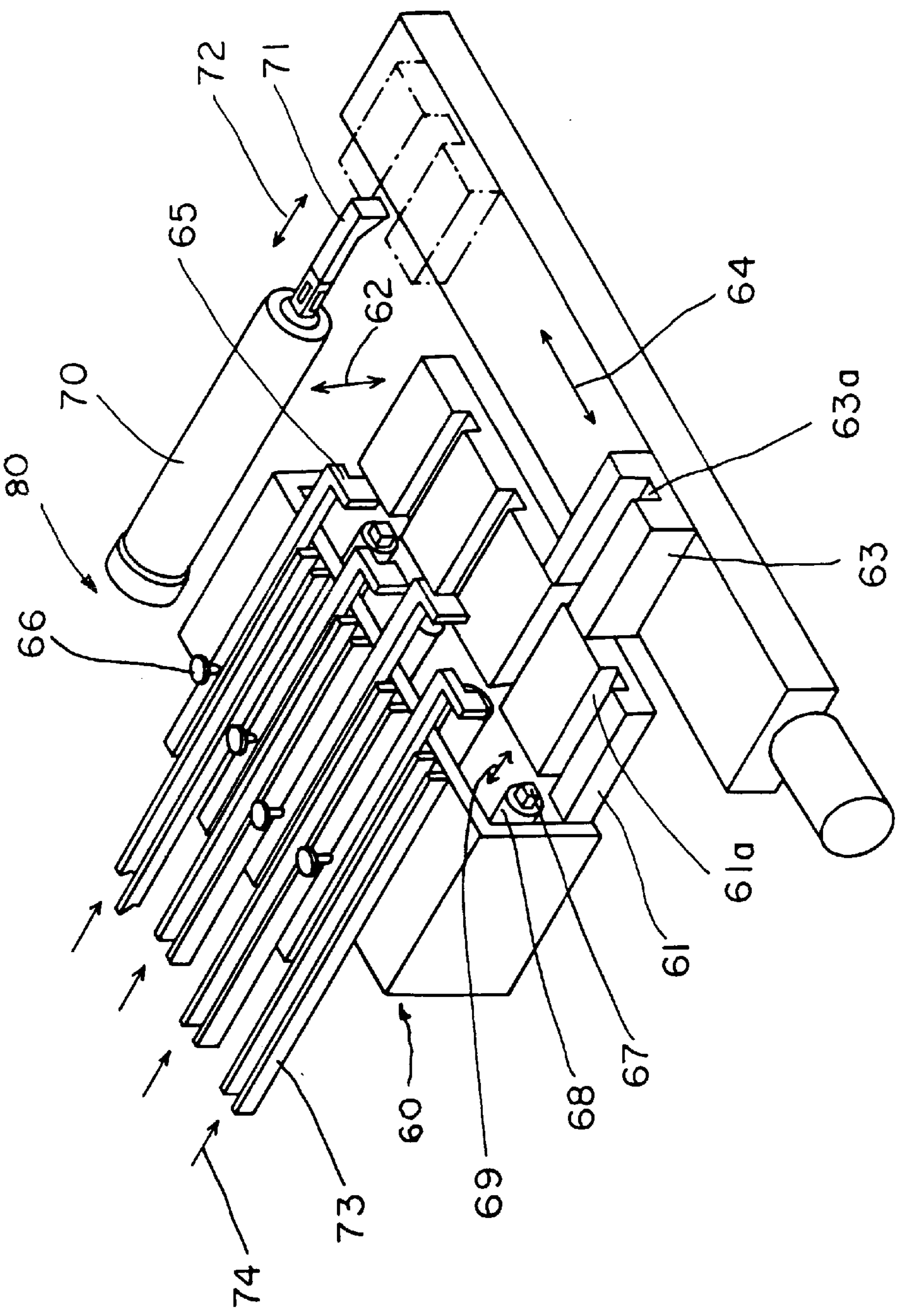
FIG. 6 PRIOR ART

Referring first to FIGS. 1 and 5, a harness-making apparatus is illustrated generally at 1. The apparatus 1 has a connector feeder apparatus 2A, 2B constructed in accordance with the principles of the present invention. As seen best in FIG. 1, the connector feeder apparatus includes two connector feeding sections 2A and 2B. One connector feeding section 2A, shown in the left of FIG. 1, receives four types of connectors 4 from four associated connector feeders 3 whereas the other connector feeding section 2B shown in the right of FIG. 1, receives just one type of connectors 4 from one associated connector feeder 3. Thus, the harness-making apparatus 1 illustrated may make a variety of wire harnesses, with each wire harness having one connector applied to one end of the harness wires and four connectors applied to the other end of the harness wires. The four connectors may be of the same type or of different types.

Figure 2:
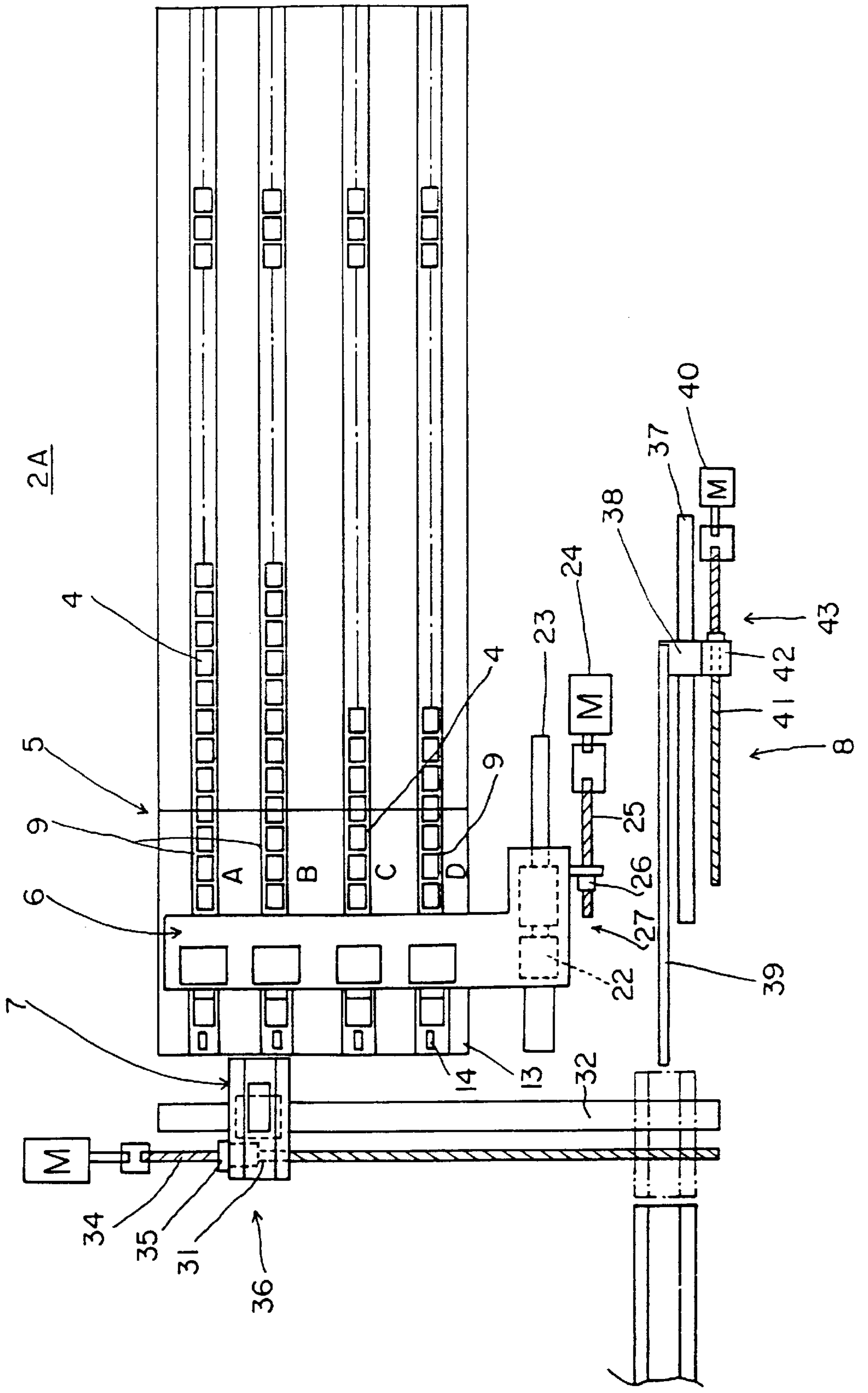
FIG. 2 is an enlarged plan view of the main part of the connector feeder apparatus of FIG. 1.
Figure 3:
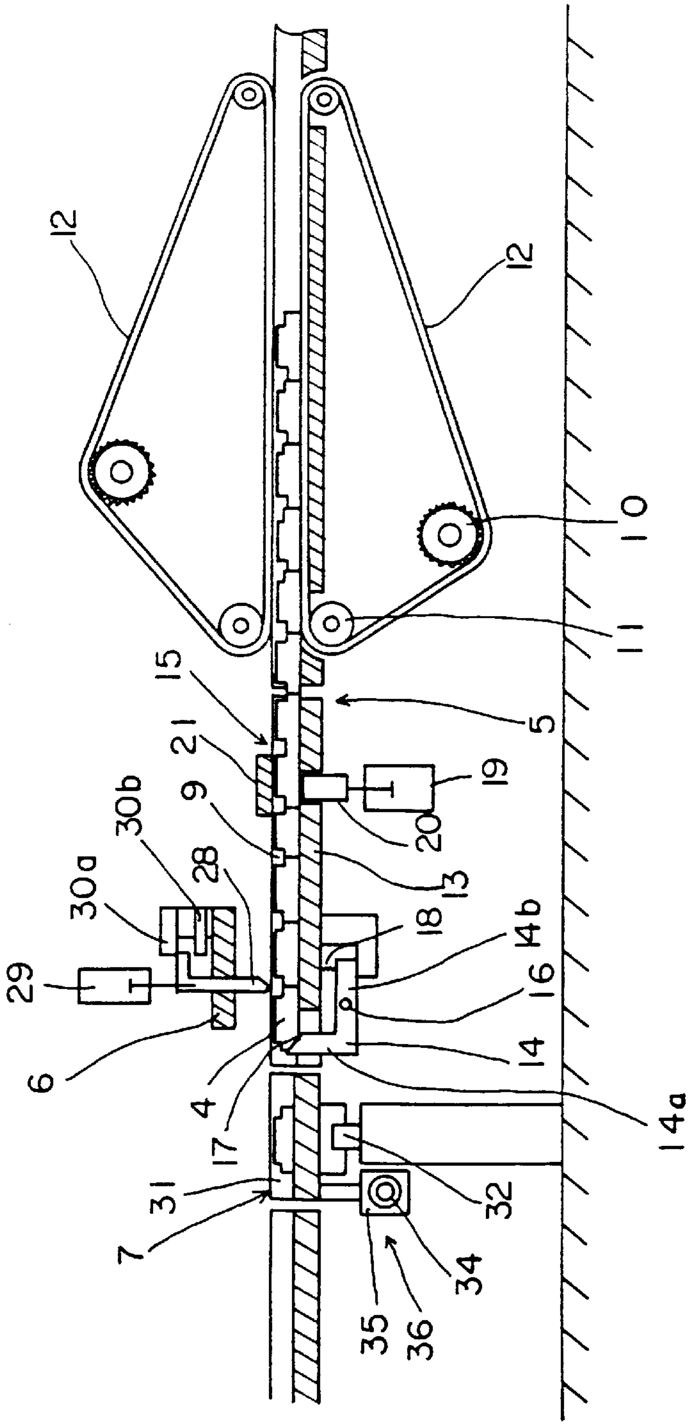
FIG. 3 is a longitudinal sectional view of the main part of the connector feeder apparatus of FIG. 2.

As illustrated in FIG. 2, each connector feeding section 2A, 2B includes a longitudinal connector holder 5 that supports a preselected number of longitudinal connector slots 9 illustrated as four in number. These slots 9 receive and hold longitudinal trains of connectors 4 that are fed from associated connector feeders 3. Turning to FIG. 3, each feeding station 2A, 2B includes a movable connector selector, shown as a finger plate 6 that is positioned above the connector slots 5, while a shuttle 7 is positioned ahead of the connector slots 5. This connector shuttle 7 receives connectors 4 from the connector slots 5 and shuttles them to an adjacent connector loading station 8. (FIGS. 1 & 2.)

FIGS. 2 and 3 illustrate the leftmost connector feeding section 2A in respective plan and sectional views. The connector section 2A includes a connector holder 5 having an elongated lane plate 13 with four longitudinal connector slots, or lanes, A,B, C and D disposed thereon, with each lane A–D being allotted to holding trains of different types of connectors 4. Each longitudinal connector slot 9 contains a train of connectors 4. A pair of upper and lower endless belts 12 are disposed above and below the trains of connectors 4 for driving the connectors 4 forward within their respective slots A–D.

The lane plate 13 is disposed at the forward extent of the connector holder 5 and includes a series of connector stops 14 disposed along its lower surface. One connector stop 14 is allotted to each one of the connector slots 9, and is biased by a spring into a first position ahead of a given train of connectors 4. Each connector slot 9 has a brake assembly 15 associated therewith which is spaced apart from and upstream of an associated connector stop 14 in order to selectively prevent the train of connectors 4 from advancing within their connector slots 9.

The stop 14 is illustrated in the form of a L-shaped bar that is rotatably mounted beneath the lane plate 13. A vertical leg portion 14*a* of the L-shaped bar 14 may be chamfered at an end to form a slanted surface 17, whereas the other, horizontal leg portion 14*b* of the L-shaped bar 14 is also connected to the lane plate 13 by a spring 18 in a manner such that the spring biases vertical leg portion 14*a* upwardly into the path of the connector slot 9 in its normal operating position.

The brake assembly 15 includes a piston cylinder 19 positioned in opposition to and beneath the lane plate 13 that has a displaceable brake rod 20 connected thereto. An abutment piece 21 is located above the lane plate 13 in opposition to the brake rod 20 and forms a braking surface against which the brake rod 20 may push a connector 4 in order to stop its movement within its connector slot 9.

As seen in FIG. 2, the finger plate 6 is equipped with a linear drive mechanism 27 in order to drive the finger plate 6 longitudinally along the axes of the trains of the connectors 4 and of the connector slots 9. The finger plate 6 is positioned above the lane plate 13 for its reciprocatable movement and the finger plate 6 is at least partially guided in this movement by a guide rail 23 that extends along the connector holder 5 and which passes through one side of the finger plate 6. A linear drive assembly 27 is provided to drive the finger plate 6 and it includes a motor 24 with a threaded rod 25 connected to its shaft and a drive nut 26 threaded onto the threaded rod 25. The drive nut 26 is connected to one side of the finger plate 6 so that the finger plate 6 may be reciprocatably driven by the drive assembly 27 when the motor 24 rotates in either of its two directions.

Figure 4:
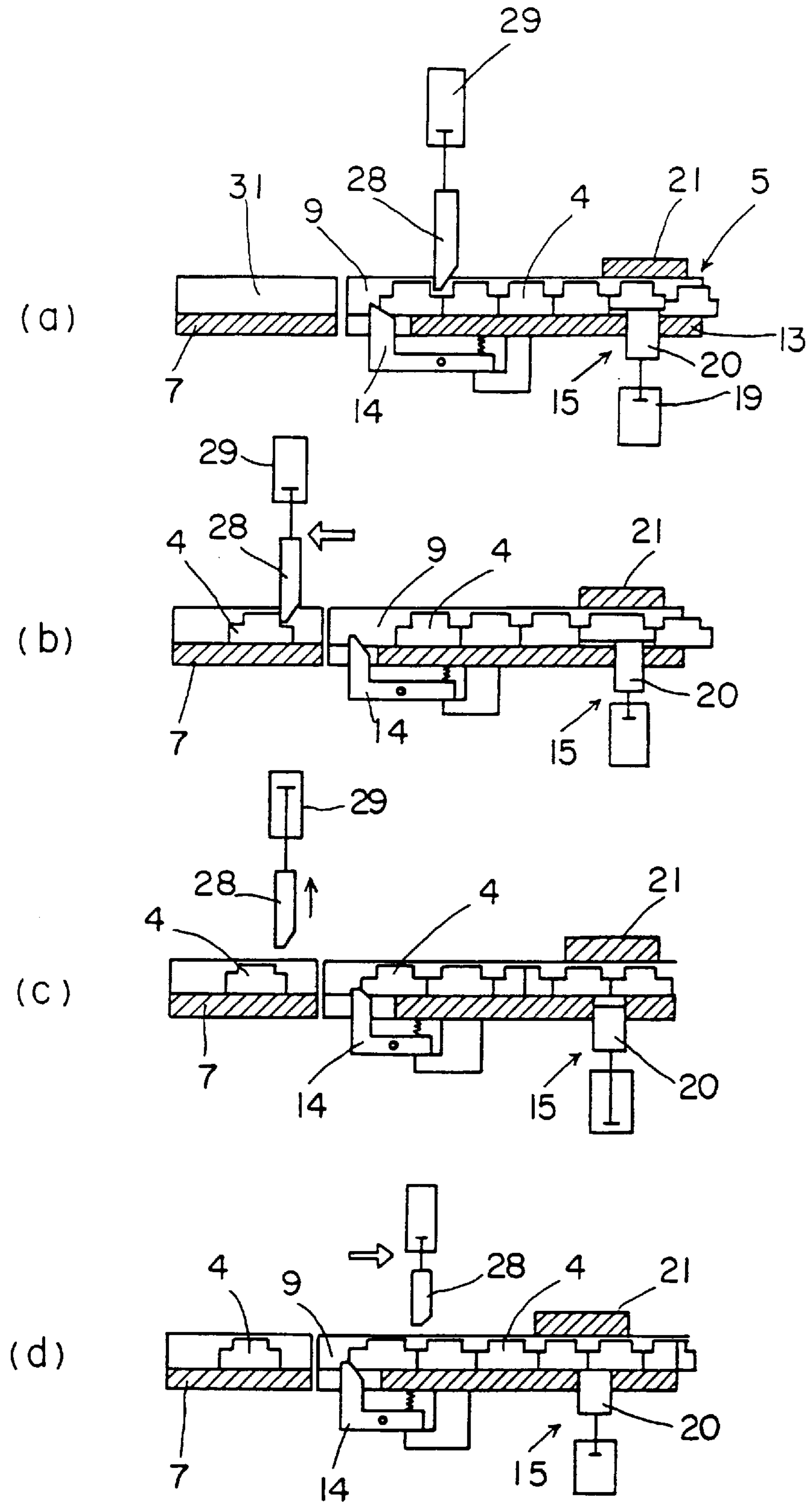
FIGS. 4*a–d* are diagrammatic views arranged in sequence illustrating the operation of the connector engagement fingers, stops and brakes of the connector feeding apparatus of FIG. 2.

As indicated by FIG. 4, the finger plate 6 includes a plurality of fingers 28 disposed thereon and preferably positioned in alignment with respective connector slots 9. Each of these fingers 28 has a piston cylinder 29 operatively associated with it for independently raising and lowering the finger 28 out of and into engagement with a connector 4. The finger 28 will therefore catch on and engage a selected connector 4 in an associated connector slot 9 when lowered, and will leave the connector slot 9 and disengage connectors 4 when raised. The presence of the finger 28 at either its upper or lower positions may be detected with the aid of respective upper and lower sensors 30*a* or 30*b* that produce a signal representing the arrival of the finger 28 at their respective upper or lower positions.

The connector shuttle 7, as shown in FIG. 2, includes a slot 31 formed in its upper surface, and the shuttle 7 is preferably driven on a guide rail 32 by way of an associated linear drive assembly 36. This drive assembly 36 includes a motor 33 that has a threaded road 34 operatively connected to its shaft and a drive nut 35 that is threaded onto the threaded rod 34. The drive nut 35 is connected to the shuttle 7 such that the connector shuttle 7 will be reciprocated back and forth by its drive assembly 36 when the motor 33 rotates in either of two directions. While the shuttle 7 traverses a path along the connector holder 5, it will receive any required number of connectors 4, one after another, from the connector slots 9 of the connector holder 5 and thus hold these connectors 4 within the connector shuttle in a particular arrangement.

The connector loading means 8 of the apparatus is preferably positioned that it will face, or oppose, the connector shuttle 7 when the shuttle 7 is driven along its path to a side of the connector holder 5. The connector loading means 8 includes a drive assembly 43 that drives a connector pushrod 39. The drive assembly 43 includes a motor 40 with a threaded rod 41 operatively connected to its shaft and as well as an associated drive nut 42 that threadedly engages the threaded rod 41. This drive nut 42 is connected to the push rod 39 so that the drive assembly 43 may reciprocatably drive the connector pushrod 39 in and out of the shuttle connector slot 31 depending on the direction of rotation of the motor 40, to thereby eject the connectors 4 in their particular order from the connector shuttle 7.

The other connector feeding section 2B is similar to the connector feeding section 2A in structure, but differs in the described embodiment in that the connector holder 5 has a single connector slot 9 designated as E.

The operation of apparatus of the invention will be described. Assume that the first connector feeding section 2A selects five connectors to make a combination-and-permutation, or selected arrangement, of the following five connectors: 3-pole connector, 3-pole connector, 2-pole connector, 2-pole connector and 5-pole connectors for termination by the harness-making apparatus 1 to one set of harness wire ends, while the second connector feeding section 2B selects one 4-pole connector for termination to the other set of harness wire ends. In the connector feeding section 2A, connector slot A is loaded with 2-pole connectors, connector slot B is loaded with 3-pole connectors, connector slot C is loaded with 4-pole connectors, and connector slot D is loaded with 5-pole connectors. Likewise, in the connector feeding section 2B the lane E is loaded with 15-pole connectors.

The finger plate drive assembly 27 moves the finger plate 6 from its original position to an engagement position where the finger 28 can engage one 5-pole connector in connector slot D. After receiving a signal from the servomotor 24 of the drive assembly 27 that indicates the finger plate 6 has descended to a connector engagement position, the finger drive assembly 29 is operated and the finger 28 descends into the connector slot D. After the lower sensor 30*b* detects the presence of the finger 28 at this lower engagement position, the shuttle drive assembly 36 moves the connector shuttle 7 into alignment wherein the connector shuttle slot 31 opposes and is aligned with connector slot D. After receiving a signal from servomotor 33 of the drive assembly 36 that indicates the connector shuttle 7 has shifted to this alignment position, the finger plate drive assembly 27 moves the finger plate 6 forward to push one 5-pole connector into the connector shuttle slot 31. When the finger plate 6 moves this connector 4 onto the shuttle 7, the piston cylinder 29 raises the finger 8 to its upper disengagement level where the upper sensor 30*a* provides a signal indicating that the finger 28 has been raised. In response to that signal, the drive assembly 27 moves the finger plate 6 back to another connector engagement position for connector slot A wherein the finger 28 can engage two 2-pole connectors of connector slot A.

FIG. 4 illustrates diagrammatically how the fingers of the finger plate 6 works in cooperation with the connector stop 14 and the connector brake 15. As shown in FIGS. 4*a* & 4*b*, the finger plate 6 moves forward with its finger 28 in its lowered position in order to engage and push a selected connector 4 into the connector shuttle 7. The connector 4, when engaged by the finger 28 moves against the slanted surface of the vertical leg portion 14*a* of the L-shaped connector stop 14 and causes the vertical leg portion 14*a* to yield in a manner by which the L-shaped stop 14 rotates counterclockwise to thereby withdraw from the connector slot 9 and allowing the adjacent connector 4 to pass by into the shuttle 7. Then L-shaped stop bar 14 subsequently returns to its original position under the urging of the spring 18 where it projects into the connector slot 9. In cooperation with the advancement of the finger 28, the piston cylinder 19 raises the brake rod 20 upward into the connector slot 9 to thereby pinch a selected connector 4 between the raised brake rod 20 and the overlying plate 21 in order to prevent any following connectors 4 from moving toward the connector stop 14.

Referring now to FIGS. 4*c* and 4*d*, the piston cylinder 29 raises its associated finger 28 until the finger 28 is drawn apart from the train of connectors 4 (FIG. 4*c*). The drive assembly 27 subsequently moves the finger plate 6 back to its original position, and simultaneously the brake rod 20 is lowered into a release position, where the train of connectors 4 may be driven forward by the upper and lower drive belts 12 until the connector at the head of the train reaches the stop 14.

As mentioned earlier, the finger plate drive assembly 27 then moves the finger plate 6 to another engagement position where the finger 28 is able to select two 2-pole connectors 4 from connector slot A. After receiving a signal from the servomotor 24 of the drive assembly 27 that indicates the shifting of the finger plate 6 to the second connector engagement position, the piston cylinder 29 is operated in order to lower the finger 28 into the connector slot A behind the two most forward connectors 4 of the connector train located in connector slot A. Once the lower sensor 30*b* detects the arrival of the finger 28 into its lower connector-engagement position, the drive assembly 36 moves the connector shuttle 7 to its next alignment position wherein the shuttle slot is aligned with connector slot A. After receiving a signal from the servomotor 33 of the drive assembly 36 that indicates movement of the shuttle 7 to the proper alignment position before connector slot A, the drive assembly 27 subsequently moves the finger plate 6 forward so that the finger 28 thereof pushes two of the 2-pole connectors located in connector slot A into the shuttle slot 31.

Once the two 2-pole connectors are moved into the shuttle slot 31, the piston cylinder 29 raises the finger 28 to its upper level and the drive assembly 27 moves the finger plate 6 to its subsequent engagement position where the finger 28 can then select two 3-pole connectors from connector slot B. After receiving a signal from the drive assembly 27 that indicates shifting of the finger plate 6 to a new engagement position, the piston cylinder 29 moves the finger 28 into engagement with the connectors 4 located in connector slot B. When the lower sensor 30*b* detects the arrival of the finger 28 at this engagement position, the drive assembly 36 thereupon moves the connector shuttle 7 to an alignment position where the shuttle slot 31 is aligned with connector slot B. After receiving a signal from the drive assembly 36 indicating the shuttle 7 has shifted to the next desired alignment position, the drive assembly 27 moves the finger plate 6 forward to push two 3-pole connectors into the shuttle slot 31. At this time, the connector shuttle has five connectors in its associated slot 31 in the following order: 5-pole connector, 2-pole connector, 2-pole connector, 3-pole connector and 3-pole connector.

After putting the required combination-and-permutation of connectors 4 into the shuttle slot 31, the finger 28 is again raised and returned to its original position, and the connector shuttle 7 is brought to the connector loading station.

On the other hand, the connector feeding section 2B works in the same way as connector feeding station 2A, thereby shifting one 15-pole connector 4 from the connector slot E to the connector shuttle 7, and the shuttle 7 is then moved to the connector loading station where the shuttle 7 is aligned with the connector loading means 8. The connector loading means 8 includes a linear drive assembly 43 having a motor 40 and a reciprocatable rod 41 that is driven forward and backward.

The drive assembly 43 receives a signal from the drive assembly 36 that indicates the arrival of the connector shuttle 7 at the connector loading position and thereupon extend its associated pushrod 39 into the connector shuttle 7 in order to push the connectors 4 from the shuttle slot 31 to the wire connecting station. When it receives a signal from the servomotor 40 of the drive assembly 43 that indicates the connectors 4 in the shuttle slot 31 have been moved out to the wire connecting station, the servomotor 40 rotates in the opposite direction to retract the pushrod 39. The servomotor 40 generates a signal that indicates retraction of the pushrod 39 and the drive assembly 36 thereupon drives the shuttle 7 to its initial position where the connector shuttle 7 is located in front of the connector holder 5. The proceeding described above is repeated to supply similar combination-and-permutation of connectors to the wire connecting station.

As may be understood from the above, the number of connectors 4 fed to the shuttle 7 from the connector holder 5 in each connector feeding section 2A, 2B may be determined in terms of the distance of travel of the finger plate 6 so that the amount of rotation of the servomotor 24 of drive assembly mechanism 27 required as a preliminary arrangement prior to beginning connector feeding may be easily made with the aid of a microcomputer. This requires no mechanical or manual settings, and hence requires neither extensive labor nor skillfulness in adjustments preliminary to operation of the apparatus.

Advantageously, the connector holder 5 is located in the same plane of operation as the connector shuttle 7, thus requiring no lifting in order to raise and lower selected connectors between different levels as is needed in the prior art, thereby accordingly reducing the time involved for feeding connectors, and improving the efficiency of the feeding work in a harness-making operation.

Still further, the connector feeder apparatus of the present invention may easily meet any requirements for combination and permutation of connectors no matter how complicated such combination and permutation of connectors may be, such as: 2-pole connector, 2-pole connector, 2-pole connector, 4-pole connector, 2-pole connector, 2-pole connector and 3-pole connector. Thus, the connector feeder apparatus of the present invention expands the horizon of harness-making to possible maximum.

The distance through which the pushrod 39 is extended in the connector loading means 8 varies with the number of connectors 4 that are fed to the wire connecting station in a particular cycle of operation. The forward or backward stroke of the connector loading pushrod 39 may be easily set in terms of the rotation (or number of rotations) of the servomotor 40 of the drive assembly 43.

The connector stop 14 that is located in each connector slot 9 of the connector holder 5 will stop the connector at the head of a connector train at a predetermined position. Accordingly, the finger 28 of the finger plate 6 may be put at an exact, desired position spaced away from the connector stop 14 so as to align with and engage a connector selected among the train of connectors 4. The finger 28 can be controlled very well and therefore, there is no fear of causing any damage by striking against connectors or by allowing the finger 28 to move out of the connector slot 9. The connector brake assembly 15 on the upstream side of the connector stop 14 prevents extra connectors from overriding the stop 14 in order to permit connectors 4 to be fed as required without causing an intermission. The upper and lower drive belts 12 drive the following train of connectors 4 immediately forward upon demand, thereby significantly reducing the time for cyclical feeding of connectors.

Referring now to FIG. 5, wires 44 of predetermined lengths are fed from wire supply reels 45 to the termination station where they are terminated, at opposing ends of the wires, to connectors 4 that are fed from the connector feeders 2A and 2Bin order to provide wire harnesses. The wires 44 are fed from the supply reels 45 and the wires 44 are straightened in an straightening unit 46. The wires 44 are subsequently measured by a wire-measuring unit 47 and cut at a wire-cutting unit. Connectors 4 are thereupon fixed to the opposite ends of the parallel-arranged wires 44 in the terminating units 49A, 49B in order to provide completed wire harnesses. These wire harnesses are checked at a testing station 50 and defective harnesses, if found, are rejected at a rejection station 51. The operating factors can be set optionally with the aid of an operating console 52 that includes a known control means such as a microprocessor.

While the preferred embodiment of the invention have been shown and described, it will be apparent to those skilled in the art that changes and modifications may be made therein without departing from the spirit of the invention, the scope of which is defined by the appended claims.

What is claimed is:

1. A connector feeding apparatus for use in a wire harness assembly systems that connects at least two electrical connectors to opposing ends of a set of harness wires, the apparatus comprising:

a connector holder for holding a plurality of connectors in separate trains of connectors and with different types of connectors being disposed in different connector trains on the connector holder;

a finger plate disposed above said connector holder, the finger plate being operatively connected to a finger plate drive assembly for reciprocatably driving said finger plate in directions parallel to axes of said connector holder connector trains;

a plurality of engagement fingers disposed on said finger plate and equal in number to said connector trains, said engagement fingers being operatively connected to respective drive assemblies that selectively drive said engagement fingers into and out of engagement with selected predetermined connectors of said connector trains;

a connector shuttle disposed in alignment with and in the same plane as said connector holder, the connector shuttle including an elongated slot for receiving in a preselected order, connectors moved from said connector trains through movement of said finger plate, said connector shuttle being operatively connected to a shuttle drive assembly for moving said shuttle between said connector trains of said connector holder and a connector loading assembly, said connector engagement fingers being operatively connected to respective drive assemblies that reciprocatably drive said connector engagement fingers into and out of engagement with said predetermined connectors of said connector trains; and, the connector loading assembly including means for ejecting said connectors from said connector shuttle slot, said connector loading means being disposed in the same plane as said connector shuttle and said connector holder and further being disposed alongside said connector holder such that said connector shuttle faces said connector loading means when moved from said connector holder to said connector loading means.

2. The connector feeding apparatus as set forth in claim 1, wherein said connector holder includes a plurality of elongated, hollow connector slots for receiving and holding said connector trains and said connector engagement fingers of said finger plate being equal in number to the number of said connector slots, one such connector engagement finger being aligned with a single connector slot.

3. The connector feeding apparatus as set further in claim 2, further including plurality of displaceable connector stops extending into said connector slots, the connector stops being biased into a connector stopping position and having a slanted surface that engages said connectors and urges said connector stops out of said connector slots in response to movement of said predetermined connectors by of said finger plate.

4. The connector feeding apparatus as set forth in claim 1, wherein each of said connector slots includes a connector brake operatively associated therewith, each connector brake including a drive assembly for reciprocatingly driving said connector brake into and out of said connector slots to stop movement of said connectors in said connector slots.

5. The connector feeding apparatus as set forth in claim 1, further including a connector drive mechanism for advancing said connector trains within said connector slots, the drive mechanism including at least one drive belt that contacts an exposed surface of said connectors.

6. The connector feeing apparatus as set further in claim 1, wherein said connector loading assembly includes an elongated pushrod reciprocatably driven by a connector loading drive assembly, the pushrod being selectively moved into said connector shuttle slot when said connector shuttle is aligned with said connector loading assembly and subsequently moving said connectors disposed therein out of said shuttle slot to a termination station.

7. The connector feeding apparatus as set further in claim 1, wherein said finger drive assemblies include a plurality of power cylinders having respective pushrods that are operatively connected to said connector engagement fingers.

8. The connector feeding apparatus as set further in claim 1, wherein said finger plate drive assembly includes a servomotor, a threaded shaft operatively connected to said servomotor, a drive nut disposed on said threaded shaft and in engagement with said finger plate, whereby movement of said finger plate back and forth along said connector holder is effected by rotating said motor drive shaft, and whereby movement of said finger plate along said connector trains may be calculated in terms of the rotation of said servomotor.

9. The connector feeding apparatus as set further in claim 1, wherein said shuttle drive assembly includes a shuttle servomotor with a drive shaft, an elongated threaded rod operatively connected to said drive shaft and disposed ahead of said connector holder and extending generally transverse to said connector train axes, and said shuffle drive assembly further including a drive nut that threadedly engages said threaded rod and is affixed to said shuttle such that rotation of said drive shaft by said shuttle servomotor moves said shuttle.

10. A connector feeding apparatus for use with a wire harness making system wherein at least two connectors are connected to two opposing ends of a set of harness wires to form a completed wire harness, the feeding apparatus comprising:

a holder for holding a plurality of different types of connectors in longitudinal arrays of connectors, wherein each connector array contains a preselected number of connectors of the same type;

the holder including a plurality of elongated, connector slots each of the connector slots receiving one of said connector arrays therein;

a connector selector assembly for selecting a predetermined number of connectors from a predetermined number of said connector arrays, the connector selector assembly being disposed in a plane above said holder;

said connector selector assembly including a selector base that extends above and across all of said connector slots of said holder, the selector base being selectively reciprocatably driven by a selector drive assembly above said connector slots and forward and backward along said connector arrays into engagement with selected connectors of said connector arrays, a plurality connector engagement legs depending down from said connector selector, said connector engagement legs being equal in number to the number of connector slots and being independently and selectively actuatable into and out of engagement with selected connectors of said connector arrays;

said connector selector assembly including a plurality of individual actuators for selectively actuating said connector engagement legs into and out of engagement with selected connectors of said connector arrays such that forward movement of said selector base advances a selected number of connectors out of a selected connector slot through an exit thereof; and, a connector shuttle disposed forward of said connector slot exits and movable between said connector slot exits and a connector ejector, the connector shuttle having a slot disposed thereon of sufficient length which accommodates a preselected number of connectors for termination to one of said two opposing ends of said harness wire sets said connector shuttle being disposed in the same plane as said connector slot exits.

11. The apparatus of claim 10, wherein said connector ejector is disposed alongside said connector selector assembly, the connector ejector including an elongated ejection rod driven by an ejector drive means, the ejection rod being aligned with said connector shuttle to thereby move said connectors out of said connector shuttle slot by urging from said ejection rod.

12. The apparatus of claim 10, wherein each of said connector slots includes a connector stop interposed into the path of said connector slot connector array, the connector stop being biased into said connector slot by a resistance spring.

13. The apparatus of claim 12, wherein said connector stops are rotatably mounted to said holder, and each of said connector stops include a slanted face that leading connectors of said connector arrays in said connector slots, said slanted face facilitating rotation and movement of said connector stop out of said connector slot under urging by said leading connectors during movement of said connector selector.

14. The apparatus claim 10, further including a connector array drive assembly having at least one drive belt extending along a length of said holder and contacting said connector arrays.

15. The apparatus of claim 14, further wherein each connector slot has a connector brake associated therewith that is selectively displacable into and out of said connector slot into and out of braking contact with said connector array in said connector slot.

16. The apparatus of claim 10, further including a linear drive assembly for driving said selector member in a linear path above said connector slots, the drive assembly including a servomotor an elongated threaded rod threadedly engaging said selector member such that rotation of said servomotor in a first direction moves said selector member forward with respect to said connector slots and rotation of said servomotor in a second direction moves said selector member backward with respect to said connector slots, whereby a preselected distance corresponding to forward and backward movement of said selector member maybe effected by a preselected number of rotations of said servomotor.

17. The apparatus of claim 10, further including a second linear drive assembly for a driving said connector shuttle in linear paths back and forth between said connector slot exits and said connector ejector.

* * * * *